(12) United States Patent
Konen

(10) Patent No.: US 6,896,242 B1
(45) Date of Patent: May 24, 2005

(54) FISH TAPE HAVING A THUMB WINDER

(75) Inventor: Bruce P. Konen, Aurora, IL (US)

(73) Assignee: Ideal Industries, Inc., Sycamore, IL (US)

( * ) Notice: Subject to any disclaimer, the term of this patent is extended or adjusted under 35 U.S.C. 154(b) by 0 days.

(21) Appl. No.: 10/173,092

(22) Filed: Jun. 17, 2002

(51) Int. Cl.⁷ ................................. E21C 29/16
(52) U.S. Cl. ............................. 254/134.3 FT
(58) Field of Search ................ 254/134.3 FT, 254/134.3 R; 15/104.31, 104.32, 104.33

(56) References Cited

U.S. PATENT DOCUMENTS

| | | |
|---|---|---|
| 2,743,884 A | 5/1956 | Briggs |
| RE24,250 E | 12/1956 | Waldschmidt |
| 2,913,222 A | 11/1959 | Kuzara |
| 2,928,656 A | 3/1960 | Lindsey |
| 2,969,953 A | 1/1961 | Shaw, Jr. |
| 3,067,984 A | 12/1962 | Linden |
| 3,355,123 A | 11/1967 | Schinske |
| 3,528,644 A | 9/1970 | Scott |
| 3,533,599 A | 10/1970 | Hindenburg |
| 3,549,127 A | 12/1970 | Niemann |
| 3,568,947 A | 3/1971 | Oprins |
| 3,582,044 A | 6/1971 | Gardner |
| 4,573,829 A | 3/1986 | Keene et al. |
| 5,106,056 A | 4/1992 | Crates et al. |
| 5,110,092 A | 5/1992 | Blaha et al. |
| 5,201,495 A | 4/1993 | Crates et al. |
| 5,505,432 A | 4/1996 | Noonan |

Primary Examiner—Robert C. Watson
(74) Attorney, Agent, or Firm—Cook, Alex, McFarron, Manzo, Cummings & Mehler, Ltd.

(57) ABSTRACT

A fish tape assembly includes a generally circular case, a fish tape and a winder. The fish tape has an inner end, an outer end and a main section. The inner end is fastened in the interior of the case to an anchor and an eyelet is formed at the outer end. A winder is slidable around the perimeter of the case. The toe of the winder is engageable with the fish tape to push it back into the case. A notch in the winder traps the eyelet to prevent the outer end of the tape from entering the case.

13 Claims, 3 Drawing Sheets

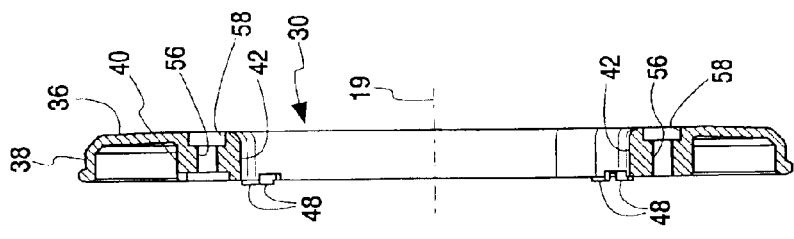
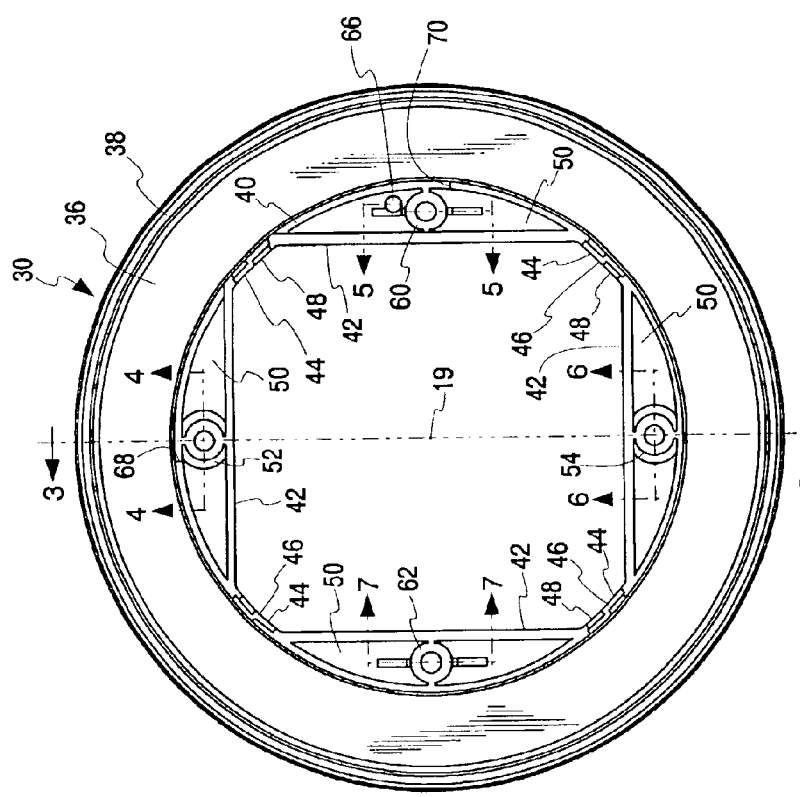
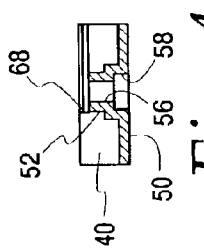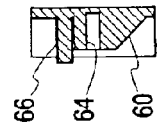

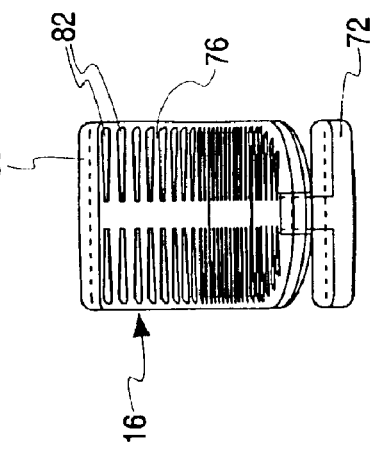
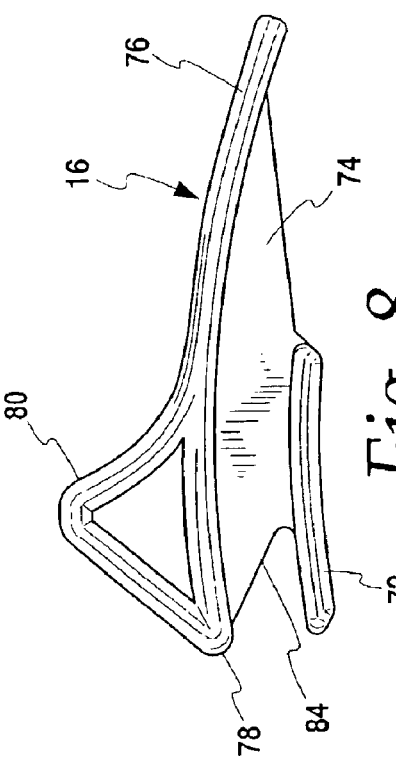
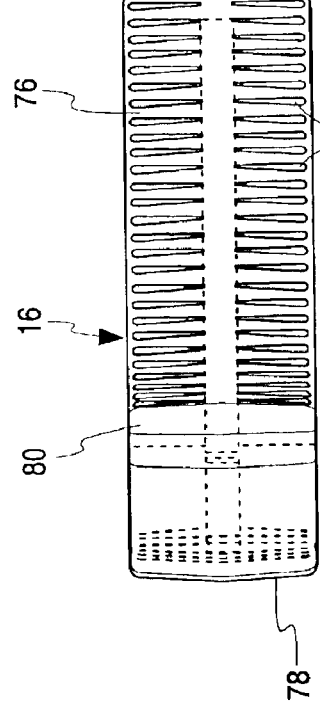
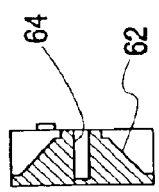
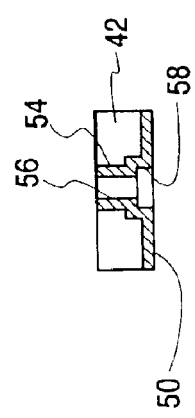

FISH TAPE HAVING A THUMB WINDER

BACKGROUND OF THE INVENTION

A fish tape is an electrician's tool which is used to install wires in a conduit. A fish tape is an elongated member made of tempered spring steel, stainless steel, nylon, fiberglass with a nylon jacket, or multi-stranded steel wire. The fish tape is rigid enough to be pushed through a conduit yet flexible enough to bend around corners or curves in the conduit. After the tape has been "fished" or threaded through a conduit, a wire or cable is attached to the end of the fish tape and the tape is pulled back through the conduit, drawing the wire with it to install the wire in the conduit.

Fish tapes are supplied in lengths ranging from 25 to 200 feet. Due to the length of the fish tape, it is usually coiled for manageability. However, the natural resilience of the material makes the coil unruly. The material at all times wants to escape the confines of the coil. That is, it seeks to return to its natural straight condition and thus wants to "spring out" of its coiled condition. Accordingly, the fish tape must be housed in some manner to maintain it in a coiled condition until it is ready to be used.

Traditionally, a housing of some sort has been used to constrain the coils of the fish tape within a chamber formed in the housing. The chamber's walls confine the coil and prevent its natural release. An opening in the housing is provided to allow the tape's exit from and entry into the housing. In some models, a slot is formed around the periphery of the housing. A handle travels around the housing, widening the slot and directing the entry and exit of the tape through the slot.

SUMMARY OF THE INVENTION

A fish tape assembly includes a case having a fish tape storable therein. The tape can be removed through a slot extending about the periphery of the case. A winder is engageable with the tape to push it back into the case. The winder does not enclose the fish tape so it is not able to pull the fish tape out of the case. This provides a reliable, functional unit that can be manufactured at reduced cost.

BRIEF DESCRIPTION OF THE DRAWINGS

FIG. 2 is a side elevation of a case half, looking at the interior of the half.

FIG. 3 is a section taken along line 3—3 of FIG. 2.

FIG. 4 is a section taken along line 4—4 of FIG. 2.

FIG. 5 is a section taken along line 5—5 of FIG. 2.

FIG. 6 is a section taken along line 6—6 of FIG. 2.

FIG. 7 is a section taken along line 7—7 of FIG. 2.

FIG. 8 is a side elevation view of the winder.

FIG. 9 is top plan view of the winder.

FIG. 10 is an end elevation view of the winder.

DETAILED DESCRIPTION OF THE INVENTION

Figure 1:
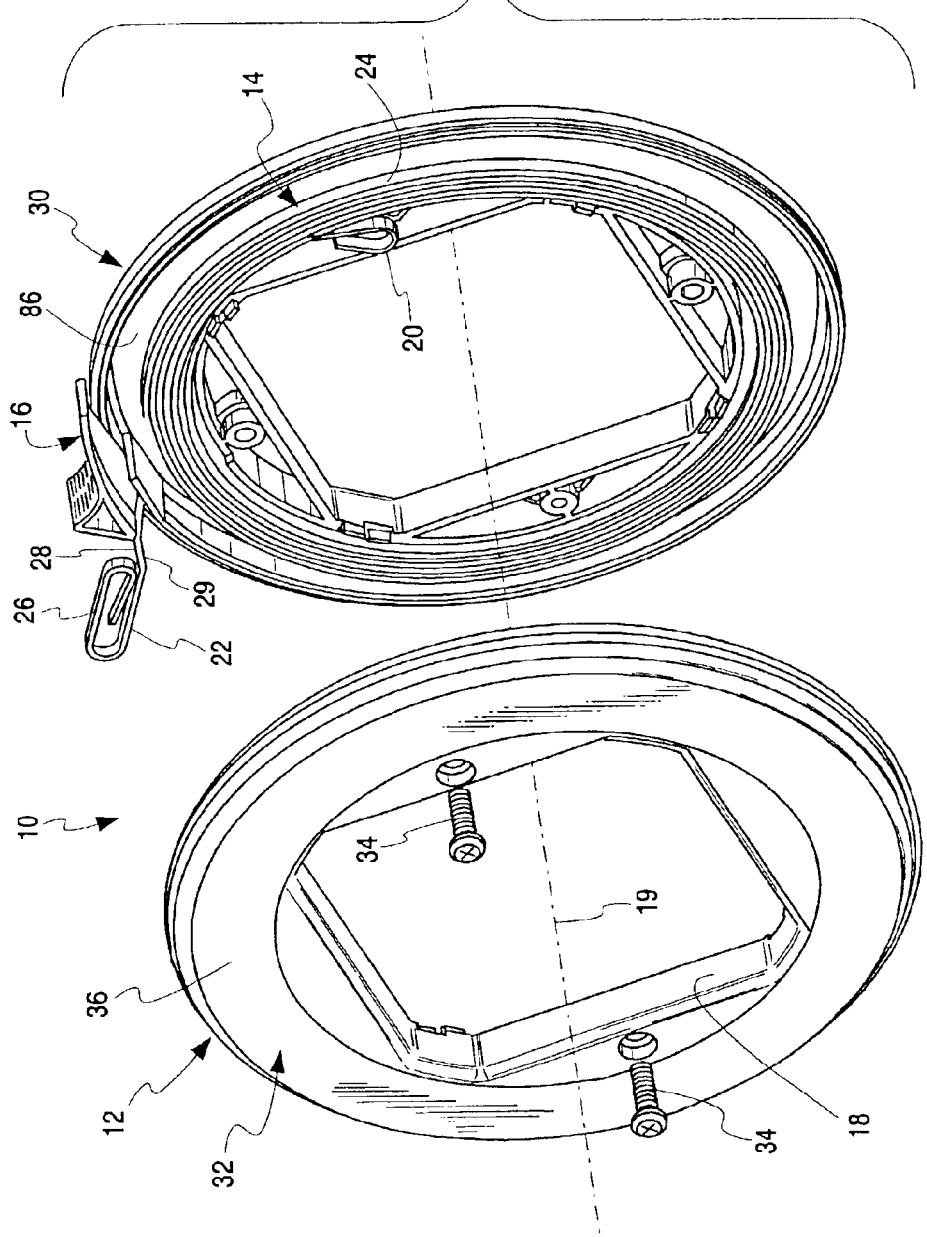
FIG. 1 is an exploded perspective view of the fish tape assembly of the present invention.

The fish tape assembly of the present invention is shown generally at 10 in FIG. 1. The fish tape assembly 10 includes a generally circular case 12, a fish tape 14 and a winder 16. The case has a central opening 18 and defines an axis 19. The fish tape in the illustrated embodiment is a flat band having an inner end 20, an outer end 22 and a main section 24 between the inner and outer ends. The inner end is fastened in the interior of the case to an anchor. The outer end 22 is always outside of the case. An eyelet 26 is formed at the outer end. The main section 24 is illustrated stored inside the case in a plurality of coils. The main section of a flat band tape defines an outer surface 28 and an inner surface 29.

The case 12 is made of first and second case halves 30 and 32. The case may be made of ABS, although other materials are possible. The halves are held together by four screws, two of which can be seen at 34 in FIG. 1. Preferably the halves are identical so only half 30 will be described in connection with FIGS. 2–7. The case half 30 includes a radial wall 36 in the shape of a ring. An outer annular half wall 38 is attached to the outside edge of the radial wall. The annular half wall is perpendicular to the radial wall and thus extends in an axial direction. Similarly, an inner annular half wall 40 is attached to the inside edge of the radial wall 36 and extends axially therefrom. Four chordal walls 42 are spaced about the interior opening 18. The chordal walls are connected by corner walls 44. Each corner wall has a pair of recesses 46 and a pair of similarly-shaped tabs 48. The tabs of one case half fit in interlocking relation with the recesses of the mating case half. Four plates 50 join the radial wall 36 to the chordal walls 42. The plates 50 each carry a screw-mounting post. Posts 52 and 54 are similar in that each has a central bore 56 and a counterbore 58 that extends through the plate 50. The counterbore receives the head of a mounting screw 34. Posts 60 and 62 define a bore 64 that does not penetrate the plate 50. Bore 64 receives the tip of a mounting screw. The case halves 30, 32 are assembled such that the post 52 of one half is aligned with post 60 of the other half and post 62 is aligned with post 54.

Adjacent to post 60 is an anchor 66 to which the inner end 20 of the fish tape is fixed. A depression in the inner annular half wall 40 extends from 68 to 70. In other words, the height of the inner half wall 40 is less between points 68 and 70 than in the remaining portion of the wall, as best seen in FIG. 4. This permits the inner end of the fish tape access to the anchor 66 which is interior of the half wall 40.

The winder 16 is shown in FIGS. 8–10. The winder has an arcuate foot 72 and a web 74 that is generally perpendicular to the foot. An arcuate shoe 76 is connected to the upper edge of the web. The shoe defines a toe 78 at one extremity thereof. The top surface of the shoe has an upraised crown 80 toward the toe end of the shoe. Serrations 82 are preferably defined in the top surface of the shoe. Beneath the toe 78 there is a notch 84 formed in the web.

When the two case halves 30, 32 are assembled the free edges of the outer and inner annular half walls 38 and 40, and the chordal walls are placed adjacent one another with tabs 48 fitting into recesses 46. The only exception is that portion of the inner half wall 40 between points 68 and 70, which as explained above remain spaced from one another due to their reduced height. Screws 34 are placed in posts 52, 54 in each case half and screwed into the posts 60, 62 of the other half. The radial walls 36 together with the inner and outer annular half walls 40 and 38 define a fish tape receiving chamber 86 (FIG. 1). The winder 16 is placed between the mating outer annular half walls 38. The web 74 extends between the outer half walls 38 and separates the adjacent free edges of the outer half walls slightly to define a slot or gap therebetween. The foot 72 is disposed in the fish tape receiving chamber 86 while the shoe 76 is on the outside of case. The foot, web and shoe are sized such that the winder is engageable with the outer annular wall and is slidable therealong. The natural flexibility of the case halves allows the web to spread the outer half walls slightly at the location of the winder. The case halves close together once the winder passes a particular location. The width of the toe 78 is such that the toe spans the gap or slot defined between the two outer half walls 38.

The use and operation of the fish tape are as follows. To play the fish tape out of the case the user holds the case with one hand and pulls on the tape with the other hand. The fish tape comes out of the case through the space or slot between the outer annular half walls 38. As the tape is pulled out it pushes the winder 16 around the perimeter of the case. The entire fish tape cannot be pulled out because the inner end 20 is fixed to the anchor 66. The fish tape is then threaded through a conduit in the usual manner. Obviously threading the tape through the conduit could be done in conjunction with pulling the tape out of the case. After the wires have been attached to the eyelet and pulled through the conduit, the fish tape is returned to the case by pushing on the crown 80 of the winder 16. The toe 78 engages the outer surface 28 of the fish tape and pushes the tape back through the slot between the case halves and into the fish tape receiving chamber 86. As the winder approaches the outer end 22 of the tape the eyelet 26 will become trapped in the notch 84. This prevents the outer end from entering the chamber 86.

The fish tape of the present invention provides a construction that is fully functional, durable and yet relatively inexpensive to manufacture.

While a preferred form of the invention has been shown and described, it will be realized that alterations and modifications may be made thereto without departing from the scope of the following claims.

I claim:

1. A fish tape assembly, comprising:
   a generally circular case defining an axis and having an outer annular wall and first and second radial walls connected to the annular wall, the outer annular wall and radial walls defining a fish tape receiving chamber;
   a slot defined in the outer annular wall;
   a fish tape having an inner end, an outer end and a main section between the inner and outer ends, the inner end being fixed to the case in the fish tape receiving chamber, the outer end having an eyelet formed thereon, and the main section extending through the slot so that the eyelet is always outside of the fish tape receiving chamber, the main section of the fish tape being windable into coils stored inside the fish tape receiving chamber and removable from the case through the slot for use; and
   a winder slidably attached to the case, the winder having a toe at one extremity thereof, the toe spanning the slot so as to be slidably engageable in abutting relation with one side of that portion of the main section of the fish tape which is extending through the slot, such that the toe can push the fish tape into the fish tape receiving chamber but cannot pull it out of said chamber, the winder further including a foot disposed in the fish tape receiving chamber, a web connected to the foot and extending through the slot to the exterior of the outer annular wall and a shoe connected to the web outside of the fish tape receiving chamber, the shoe defining said toe at one end thereof, the foot, web and shoe being sized such that the winder is engageable with the outer annular wall so as to be slidable therealong, and the web defining a notch beneath the toe of the shoe, the notch being sized to trap the eyelet between the shoe, web and outer annular wall.

2. The fish tape assembly of claim 1 wherein the fish tape is a flat band having an outer surface and inner surface, the eyelet being formed by bending the outer end of the fish tape back on itself toward the outer surface of the tape.

3. The fish tape assembly of claim 1 wherein the case further comprises an inner annular wall connected to the first and second radial walls.

4. A fish tape assembly, comprising:
   a generally circular case defining an axis and having an outer annular wall and first and second radial walls connected to the outer annular wall, the outer annular wall and radial walls defining a fish tape receiving chamber;
   a slot defined in the outer annular wall;
   a fish tape having an inner end, an outer end and a main section between the inner and outer ends, the inner end being fixed to the case in the fish tape receiving chamber, and the main section extending through the slot so that the outer end is outside of the fish tape receiving chamber, the main section of the fish tape being windable into coils stored inside the fish tape receiving chamber and removable from the case through the slot for use; and
   a winder disposed in the slot for slidable movement about the outer annular wall, the winder having a shoe located outside of the fish tape receiving chamber, the shoe having a top surface, a toe end, a heel end opposite the toe end, and an upraised crown intermediate the heel end and toe end, the top surface of the shoe at the heel end having a radial extent beyond the outer annular wall which is less than that of the crown so as to define a thumb resting surface extending circumferentially between the heel and crown.

5. The fish tape assembly of claim 4 wherein the toe spans the slot so as to be slidably engageable in abutting relation with one side of that portion of the main section of the fish tape which is adjacent to the slot.

6. The fish tape assembly of claim 4 wherein the crown has a first side surface facing the heel end and a second side surface facing the toe end.

7. The fish tape assembly of claim 6 wherein the second side surface of the crown terminates at the toe end.

8. The fish tape assembly of claim 4 wherein the winder further includes a foot disposed in the fish tape receiving chamber, a web connected to the foot and extending through the slot to the exterior of the outer annular wall, said shoe being connected to the web outside of the fish tape receiving chamber, the foot, web and shoe being sized such that the winder is engageable with the outer annular wall so as to be slidable therealong.

9. The fish tape assembly of claim 8 wherein the web defines a notch beneath the toe of the shoe, the notch being sized to trap the outer end of the fish tape between the shoe, web and outer annular wall.

10. The fish tape assembly of claim 4 wherein the case further comprises an inner annular wall connected to the first and second radial walls.

11. A fish tape assembly, comprising:
    a generally circular case defining an axis and having an outer annular wall and first and second radial walls connected to the outer annular wall, the outer annular wall and radial walls defining a fish tape receiving chamber;
    a slot defined in the outer annular wall;
    a fish tape having an inner end, an outer end and a main section between the inner and outer ends, the inner end being fixed to the case in the fish tape receiving chamber, and the main section extending through the slot so that the outer end is always outside of the fish tape receiving chamber, the main section of the fish tape being windable into coils stored inside the fish tape receiving chamber and removable from the case through the slot for use; and a winder mounted on the case for slidable movement about the outer annular wall, the winder being engageable with that portion of the main section of the fish tape which is adjacent to the slot, the winder being separable from the fish tape for slidable movement about the outer annular wall without engagement with the fish tape.

12. The fish tape assembly of claim 11, wherein the winder has a toe at one extremity thereof, the toe spanning the slot so as to be slidably engageable in abutting relation with one side of that portion of the main section of the fish tape which is adjacent to the slot, such that the toe can push the fish tape into the fish tape receiving chamber but cannot pull it out of said chamber, the winder further including a foot disposed in the fish tape receiving chamber, a web connected to the foot and extending through the slot to the exterior of the outer annular wall and a shoe connected to the web outside of the fish tape receiving chamber, the shoe defining said toe at one end thereof, the foot, web and shoe being sized such that the winder is engageable with the outer annular wall so as to be slidable therealong, and the web defining a notch beneath the toe of the shoe.

13. The fish tape assembly of claim 11 wherein the winder has a shoe located outside of the fish tape receiving chamber, the shoe having a top surface, a toe end, a heel end opposite the toe end, and an upraised crown intermediate the heel end and toe end, the top surface of the shoe at the heel end having a radial extent beyond the outer annular wall which is less than that of the crown.

\* \* \* \* \*